Figure 1:
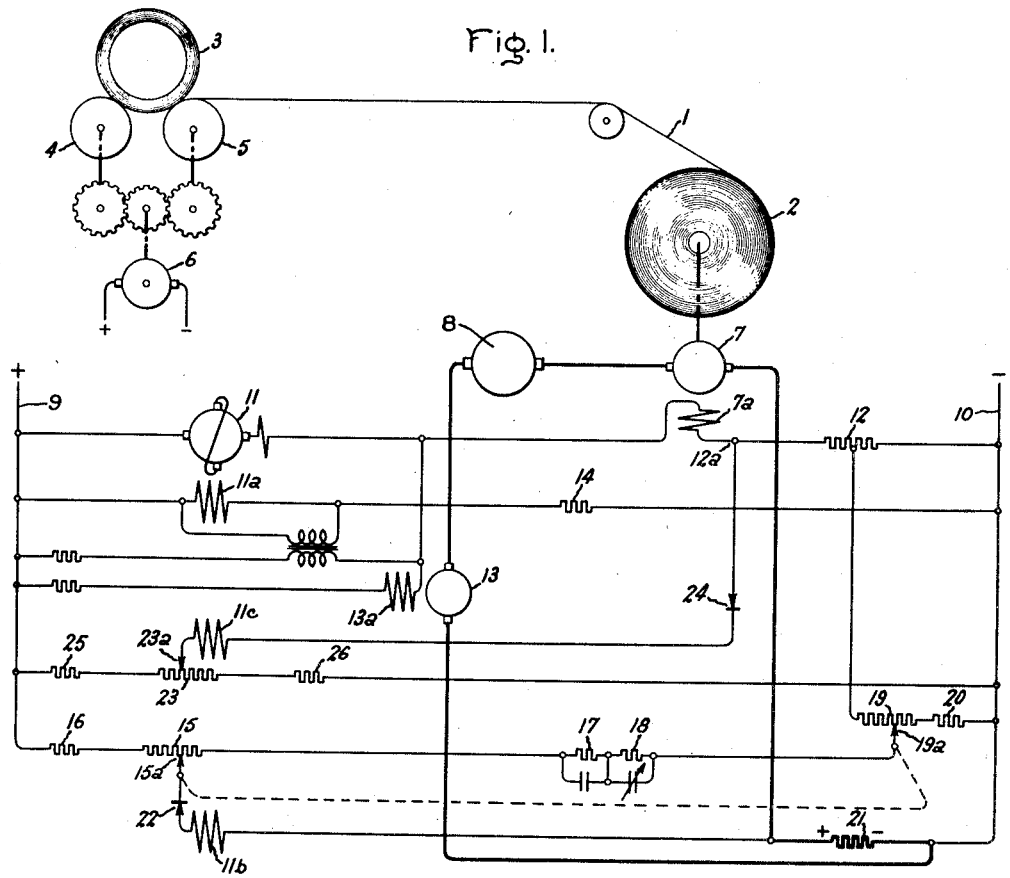

April 26, 1949.  C. B. HUSTON  2,468,557
SPEED CONTROL SYSTEM FOR
DYNAMOELECTRIC MACHINES
Filed Jan. 17, 1948

Inventor:
Claude B. Huston,
by Claude H. Mott
His Attorney.

Patented Apr. 26, 1949

2,468,557

UNITED STATES PATENT OFFICE 2,468,557

SPEED CONTROL SYSTEM FOR DYNAMO-ELECTRIC MACHINES

Claude B. Huston, Schenectady, N. Y., assignor to General Electric Company, a corporation of New York Application January 17, 1948, Serial No. 2,927

3 Claims. (Cl. 318—143)

This invention relates to control systems, more particularly to systems for controlling the operation of dynamoelectric machines and it has for an object the provision of a simple, reliable, efficient and improved control system of this character.

More specifically the invention relates to control systems for dynamoelectric machines which are directly coupled to center drive reels and which operate either as motors for driving winding reels or as generators driven by unwinding reels.

In certain winding and reeling operations, such as the reeling and unreeling of cold steel strip or paper, it is desirable to maintain constant tension in the material as the diameter of the coil on the reel changes during build-up or build-down of the coil. This can be accomplished if the voltage at the terminals of the machine is constant, by varying its field strength to maintain the armature current constant. The maximum ratio of maximum to minimum speeds that can be obtained from a conventional direct current machine by field weakening with the voltage maintained constant is approximately 4:1.

However, there are winding and reeling operations in which the ratio between maximum and minimum diameters between full and empty reel is as much as 8:1 or greater. If the tension is maintained constant by maintaining the current and voltage constant, a speed range of 8:1 by field weakening would be required. This greatly exceeds the range that can be obtained from conventional machines. Accordingly a further object of the invention is the provision of a control system which will maintain substantially constant tension in the material during winding and reeling operations in which the ratio of full to empty reel diameters exceeds the ratio of maximum to minimum speeds of the reel dynamoelectric machines that can be obtained by field weakening with the voltage at the armature terminals maintained constant.

In carrying the invention into effect in one form thereof, the shaft of a D.-C. dynamoelectric machine is directly connected to the shaft of a reel upon which a length of material is to be wound or from which it is to be unwound. The armature of the machine is connected to a source such as a generator from which it receives power when it operates as a motor and to which it delivers power when it operates as a generator. In series between the dynamoelectric machine and the source is a booster generator. The reel machine is provided with a field winding which is excited from a constant source of excitation. In series with this field winding is connected the armature of a buck-boost exciter and in parallel with the armature of the exciter is connected the field winding of the booster generator. The excitation of the buck-boost exciter is controlled by the voltage drop derived from the current in the armature circuit of the reel machine and is modified by a compensating voltage which is derived from the field circuit of the reel machine.

Figure 2:
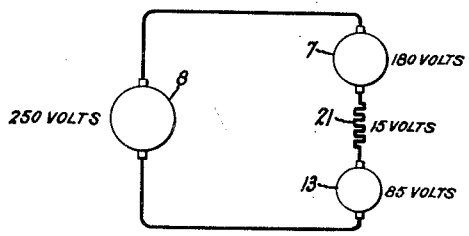
Figure 3:
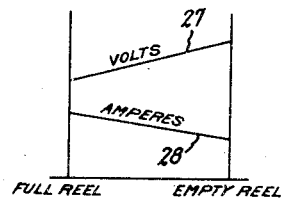

For a better and more complete understanding of the invention reference should now be had to the following specification and to the accompanying drawing of which Fig. 1 is a simple schematic diagram of an embodiment of the invention, Fig. 2 is a schematic showing of voltage under full reel balanced condition while Fig. 3 is a chart of characteristic curves.

Referring now to the drawing, a length of material 1, such as a cold steel strip or a web of paper, is being unwound from a reel 2 and rewound upon a mandrel 3, which rests upon a pair of bottom rolls 4 and 5 which are driven through suitable gearing at constant speed by means of an electric motor 6.

To the center wind shaft of the reel 2 is connected the shaft of a direct current dynamoelectric machine 7. In the operation selected for illustration, the dynamoelectric machine 7 operates as a drag generator driven by the reel to maintain tension in the strip. The armature of the machine 7 is connected to a source of direct voltage such as the main generator 8 to which it returns power as the coil is unwound. In the operation of the machine 7 to drive its reel as a winding reel, it would receive power from the generator and operate as a motor.

It is assumed that the ratio of full to empty reel diameters of the coil on reel 2 is substantially greater than the ratio of maximum to minimum speeds of the dynamoelectric machine 7 that is obtainable by weakening the field without change in the armature voltage.

The machine 7 is provided with a field winding 7a which is supplied from a constant source of excitation, such as represented by the positive and negative excitation buses 9 and 10, respectively. For varying the excitation of the machine 7, a variable voltage reversible polarity buck-boost exciter 11 is provided. It is preferably an amplidyne and its armature is connected in circuit between one terminal of the field winding 7a of the reel machine and the positive excitation bus 9. A resistor 12 is connected between the other terminal of field winding 7a and the negative excitation bus.

In series with the armature of the reel machine is connected the armature of a booster generator 13. This booster generator is provided with a field winding 13a which is connected in parallel with the armature of the buck-boost amplidyne exciter 11.

As shown, the amplidyne is provided with a reference field winding 11a which is connected across the constant excitation buses 9—10. A resistor 14 is connected in circuit with the reference field winding. The polarity of the reference field winding excitation is such as to cause the voltage of the amplidyne to add to the voltage of the excitation source, and its strength is many times greater than the strength required to produce normal rated voltage at the load brushes. The amplidyne is also provided with an opposing control field winding 11b. This field winding is energized in response to the difference of a compensated reference voltage and a control voltage which is derived from the current in the loop circuit in which the armature of the reel machine and the armature of the booster generator are connected. The reference voltage is obtained from a rheostat 15 which is connected in a circuit across the constant voltage excitation buses 9 and 10. This circuit is traced from the positive bus 9 through resistor 16, rheostat 15, resistors 17 and 18 to the slider 19a of a compensating rheostat and through resistor 20 to the negative bus 10. The compensating rheostat is connected in parallel with a portion of the resistor 12 which is connected in the field circuit of the reel dynamoelectric machine. Thus, the reference voltage referred to in the foregoing is the voltage between the slider 15a of rheostat 15 and the negative bus 10. This reference voltage varies as the current in the field circuit of the reel machine varies owing to the varying voltage drop in the active portion of the compensating rheostat 19. In other words, the reference voltage is compensated in accordance with the excitation of the reel machine.

The control voltage which is the other factor in the excitation of the opposing control field winding 11b is derived from the voltage drop across the resistor 21 which is connected in the loop circuit in series with the armatures of the reel machine 7 and the booster generator 13. As shown, one terminal of the opposing field winding 11b is connected through a blocking rectifier 22 to the slider 15a and the other terminal is connected to the positive terminal of the voltage drop resistor 21 of which the negative terminal is connected to the negative excitation bus 10. Thus the opposing field winding 11b is energized in response to the difference of the control voltage proportional to armature current and the reference voltage as compensated in response to the varying excitation of the reel machine.

The amplidyne exciter is further provided with an opposing control field winding 11c. One terminal of this field winding is connected to the slider 23a of a rheostat 23 and the other terminal is connected through a blocking rectifier 24 to the junction point 12a of resistor 12 and field winding 7a of the reel machine. The rheostat 23 is connected in series with resistors 25 and 26 across the excitation buses 9 and 10 to provide a potentiometer circuit. The excitation of the field winding 11c is thus responsive to the voltage between the point 12a and the slider 23a.

The field winding 11c is useful in controlling the speed of the reel machine during threading operations at very low speed.

With the foregoing understanding of the elements and their organization, the operation of the system will readily be understood from the following description.

At full reel the machine 7 will be driven at a slow speed and will operate as a generator to return energy to the supply generator. It may be assumed for the purpose of illustration that the voltage of the main generator 8 is 250 volts, the voltage of the reel machine 180 volts, and the voltage of the booster generator 85 volts in a direction to add to the voltage of the reel machine. The difference between the voltage of the main generator and the sum of the voltages of the reel machine and booster generator is 15 volts which appears across the resistor 21. Thus at full reel the voltages of the reel machine and the booster generator add to cause current to be supplied to the main generator and this current produces a voltage drop across resistor 21 which is utilized to control the excitation of the amplidyne buck-boost exciter. As pointed out in the foregoing, the polarity of the field winding 11a is such as to cause the voltage of the amplidyne exciter to add to the voltage of the excitation source. Thus it forces the voltages of the reel machine 7 and the booster generator 13 to build up rapidly. As these voltages build up, the current in the loop circuit rises and when it attains a value such that the voltage drop across resistor 21 exceeds the reference voltage between the negative bus and the slider 15a, current flows in the control field winding 11b in such a direction that its magnetic flux opposes the magnetic flux of the field 11a. The system quickly comes to a balanced condition. This full reel balanced condition is indicated schematically in Fig. 2.

Since the booster generator is supplying voltage in a direction to assist the reel machine, the latter may operate at a reduced voltage. That is to say, it may operate at voltage less than its normal full field voltage by an amount equal to the booster voltage.

As the coil diameter begins to decrease, the speed of the reel machine increases correspondingly thereby tending to increase its voltage and the current armature circuit. The increased voltage drop across the resistor 21 increases the excitation of the opposing field winding 11b thereby decreasing the net excitation of the amplidyne exciter. This results in weakening the excitation of the reel machine and simultaneously weakening the excitation of the booster generator.

The decreased current in the field circuit of the reel machine results in decreasing the current in the loop circuit and also in the decreased voltage drop across the resistor 12 and a correspondingly decreased voltage drop across the active portion of the compensating rheostat between the negative conductor 10 and the slider 19a. This results in decreasing the reference voltage between the negative bus 10 and the slider 15a. Since the reference voltage has been decreased, the system becomes balanced with a lower voltage drop across the resistor 21, or in other words with a lower value of current in the loop circuit.

Since a new balance is reached at a lower value of loop circuit current, the decrease in the voltage of the amplidyne has not completely balanced out the increase in voltage of the reel machine which resulted from the decrease in diameter of the coil. The decreased amplidyne voltage has weakened the excitation of the booster generator. In other words, the voltage of the reel machine has been allowed to rise and the voltage of the booster has been allowed to decrease correspondingly.

This condition is illustrated graphically in the chart of characteristic curves in Fig. 3 in which the straight line curve 27 represents the voltage of the reel machine and the curve 28 represents the current in the loop circuit as the operation progresses from full reel to empty reel.

By allowing the voltage of the reel machine to rise, the speed range through which it can operate is increased beyond the range obtainable with field weakening alone. However, if the voltage is allowed to rise and the armature current maintained constant, the horsepower output rises proportionately and this results in a corresponding increase in the tension of the strip, which is highly undesirable.

Increase in tension is prevented, however, because the system operates to decrease the armature current of the reel machine as its voltage is permitted to rise and thus the horsepower output and consequently the tension of the strip are maintained substantially constant throughout the reeling operation.

By varying the position of the slider 15a on the rheostat 15, the value of the tension in the strip which is being held can be changed to any desired value within the range of the system. This effects a change in the reference voltage which requires a corresponding change in the armature current through the resistor 21 to bring about a balanced condition in the system. The change in armature current with the field current remaining the same produces a correspondingly changed value of tension in the strip. Since the field current is not changed, the voltage drop in the resistor 12 will be of the same magnitude irrespective of the value of tension which is being held. Consequently it becomes necessary to change the value of the compensating voltage for different values of tension. This is accomplished by providing a mechanical connection between the slider 15a of the tension adjusting rheostat and the slider 19a of the compensating rheostat. This connection is indicated in the drawing by the dotted line 29.

Although in accordance with the provision of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. A control system comprising in combination a source of direct voltage, a direct current dynamoelectric machine connected to said source and provided with a field winding, a source of reference voltage, means for deriving from the armature circuit of said dynamoelectric machine a control voltage proportional to current, a source of constant excitation voltage connected to said field winding, a buck-boost exciter having its armature connected in series between said field winding and said excitation source and having a control field winding connected to be excited in response to the difference of said reference voltage and said control voltage, a booster generator having its armature connected in series between said dynamoelectric machine and said direct voltage source and having a field winding connected across the terminals of said exciter, and means responsive to the current in the field winding of said exciter for varying said reference voltage.

2. A control system comprising in combination a first source of direct voltage, a direct current dynamoelectric machine connected to said source and provided with a field winding, a source of reference voltage, means for deriving a control voltage proportional to the armature current of said machine comprising a resistor connected in the armature circuit, a source of constant excitation voltage, a buck-boost exciter having its armature connected in series between said field winding and said excitation source and having a control field winding connected to be excited in response to the difference of said reference voltage and said control voltage, a booster generator having its armature connected in series between said dynamoelectric machine and said first source and having a field winding connected across the terminals of said exciter, and means for effecting operation of said dynamoelectric machine at substantially constant horsepower with increasing voltage comprising a permanent resistor connected in the field circuit of said direct current dynamoelectric machine and a compensating rheostat connected across said permanent resistor and connections for including the voltage drop across a portion of said compensating rheostat as a part of said reference voltage.

3. A control system comprising in combination a first source of direct voltage, a source of constant excitation voltage, a direct current dynamoelectric machine connected to said first source and provided with a field winding connected in a circuit across said excitation source, means providing a reference voltage comprising a circuit across said excitation source including a first rheostat and a compensating rheostat, means for deriving a control voltage proportional to the armature current of said machine comprising a first resistor connected in the armature circuit, a buck-boost exciter having its armature connected in series between said field winding and said excitation source and having a control field winding connected to be excited in response to the difference of said reference voltage and said control voltage, a booster generator having its armature connected in series between said first source and having a field winding connected across the terminals of said exciter, and means for effecting operation of said dynamoelectric machine at substantially constant horsepower with increasing armature voltage comprising a permanent resistor connected in the field circuit of said direct current dynamoelectric machine and connections from said permanent resistor to said compensating rheostat for supplying to said compensating rheostat a voltage proportional to the field current of said dynamoelectric machine to effect a corresponding variation of said reference voltage.

CLAUDE B. HUSTON.

No references cited.